United States Patent [19]  [11] 4,165,420
Rinehart  [45] Aug. 21, 1979

[54] SOLID STATE POLYMERIZATION OF POLYESTER PREPOLYMER

[75] Inventor: Verne R. Rinehart, Bath, Ohio

[73] Assignee: The Goodyear Tire & Rubber Company, Akron, Ohio

[21] Appl. No.: 945,161

[22] Filed: Sep. 25, 1978

Related U.S. Application Data

[63] Continuation-in-part of Ser. No. 850,119, Nov. 10, 1977, abandoned.

[51] Int. Cl.² ............................................. C08G 63/26
[52] U.S. Cl. ...................................... 526/63; 526/65; 526/67; 528/272; 528/309
[58] Field of Search ...................... 526/62, 63, 65, 67; 528/272, 309

[56] References Cited

U.S. PATENT DOCUMENTS

| 3,405,098 | 10/1968 | Heighton et al. ................ 526/65 X |
| 3,463,608 | 8/1969 | Barkey ............................... 526/65 X |
| 3,585,259 | 6/1971 | Lefferts et al. ..................... 528/309 |
| 3,817,929 | 6/1974 | Buxbaum et al. ................... 528/309 |
| 3,969,324 | 7/1976 | Berkau et al. ........................ 526/65 |

Primary Examiner—Lucille M. Phynes
Attorney, Agent, or Firm—J. P. Ward

[57] ABSTRACT

The invention relates to an improvement in the solid state polymerization of polyester prepolymer comprising the use of low molecular weight prepolymer having an intrinsic viscosity ranging from about 0.1 to about 0.35 and essentially in the form of discrete spherical beads.

8 Claims, 1 Drawing Figure

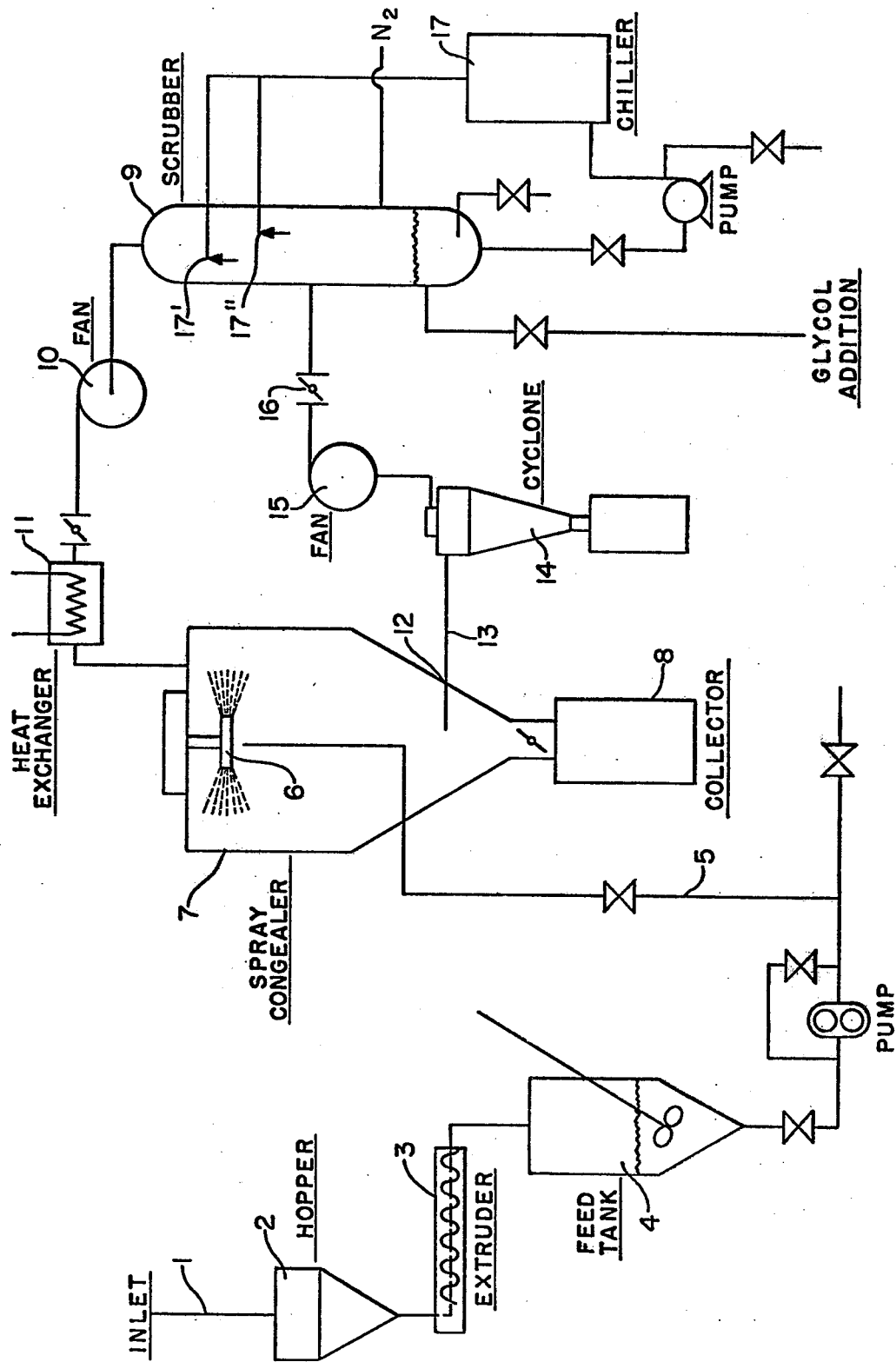

SOLID STATE POLYMERIZATION OF POLYESTER PREPOLYMER

TECHNICAL FIELD

This application is a continuation-in-part of my application Ser. No. 850,119 filed Nov. 10, 1977, now abandoned.

This invention relates to an improvement in the solid state polymerization of polyester resin to polymerize such resin to high molecular weight.

BACKGROUND ART

Solid state polymerization involves the molecular weight buildup of a low molecular weight prepolymer, usually in the form of a pellet or chip or a finely divided state such as powder, by heating under vacuum or with a hot inert gas stream.

Three types of processes have been developed. These include and are known as the vacuum process, as disclosed in U.S. Pat. No. 2,534,028 to Izard, the static bed process and the fluidized bed process, both of the latter being described in U.S. Pat. No. 3,497,477. In the static bed process an inert gas is passed continuously through a bed of prepolymer pellets or chips, at a temperature of from 200° C. to 300° C. until the prepolymer attains an intrinsic viscosity of at least 0.5.

In the fluidized bed process an inert gas is passed through a bed of finely ground prepolymer powder at a rate sufficient to suspend the particles of powder in the gas and maintain it in suspended condition while maintaining the temperature of the gas in the fluidization zone in the range of from about 5° C. to about 50° C. below the melting point of the polymer. Passage of the gas and fluidization of the polymer is continued until the polymer has an intrinsic viscosity of at least 0.5. Usually the gas is passed into a second zone where fine particles of polymer are recovered from the gas and volatile materials such as glycol, water, aldehydes and other materials distilled from the polymer are separated from the gas and the gas is recirculated to the polymerization zone.

Heretofore the form of the prepolymer has more or less dictated the type of solid state polymerization process which could be employed to convert low molecular weight prepolymer to high molecular weight polymer. For example, it has generally been accepted practice to use prepolymer in the form of pellets or chips in vacuum and static bed processes and finely ground powder in fluidized bed processes. The reason for this is that experience has shown that finely ground powders tend to agglomerate in vacuum processes, resulting in slower polymerization rates and a need to regrind the final polymer. Experience has also shown that, in static bed processes finely ground powders will channel or fissure, resulting in uneven polymerization and prolonged polymerization rates. On the other hand the use of pellets or chips in fluidized bed processes is not economically feasible in view of the velocity and volume of gas needed to suspend the pellets or chips and the size of the equipment required to do this.

DISCLOSURE OF INVENTION

This invention relates to an improvement in the solid state polymerization of polyester resin. More particularly the present invention relates to low molecular weight prepolymer essentially in the form of discrete spherical beads wherein low molecular weight prepolymer having an intrinsic viscosity of from about 0.1 to about 0.35 is formed in the molten state, converted into fine droplets by passing it through an atomizing device and the droplets solidified to form discrete particles which are mostly spherical in shape. Most particularly this invention relates to the use of these discrete essentially spherical particles or beads in fluidized bed polymerization processes in which an inert gas or dried air is passed through a layer or bed of the spherical beads at a temperature in the range of from about 5° C. to about 50° C. below the melting temperature of the beads at a rate sufficient to suspend the beads in the gas. Finally, with respect to fluidized bed solid state polymerization processes, the use of discrete essentially spherical beads or particles, the preparation of which is described in detail below, which are more uniform in shape and size than finely ground powder, provides a more uniform polymerization of the prepolymer, shorter polymerization times and substantial elimination of fines loss most commonly associated with this type of process.

129.7 pounds (58.83 kilograms) of terephthalic acid and 70 pounds (31.75 kilograms) of ethylene glycol were added to a reaction vessel containing about 240 pounds (108.86 kilograms) of an oligomer derived from the reaction of terephthalic acid and ethylene glycol, said oligomer having a degree of polymerization of about 5.0 and heated at a temperature of about 275° C. After 10 minutes 370 grams of a 10 percent (calculated as phosphorous) solution of triethylene diphosphite in glycol was added to the reaction vessel. The pressure in the reactor gradually rose to 70 pounds per square inch gauge pressure (psig) [5 kilograms per square centimeter (kg/cm$^2$)]. After about one hour and 33 minutes, during which time the pressure was reduced from 70 psig (5 kg/cm$^2$) to about 10 psig (0.7 kg/cm$^2$), about 150 pounds (68 kilograms) of the reaction mixture was transferred to a second reactor.

After 12 minutes in the second reactor 30 pounds (13.6 kilograms) of glycol and 613 grams of a solution of antimony trioxide in ethylene glycol containing 12 grams per liter of antimony (calculated as antimony metal) was added. The mixture was heated at 275° C. with stirring. The pressure in the reactor was gradually reduced to 9 millimeters of mercury pressure. The mixture was maintained at this pressure for 10 minutes. Then the pressure in the second vessel was raised above atmospheric pressure while a third vessel was evacuated to 50 millimeters of mercury pressure. The batch of the reaction mixture in the second reaction veseel was transferred to the third vessel. After the batch was completely transferred the temperature in the third vessel was regulated to 275° C. and the pressure slowed reduced to 3 millimeters of mercury pressure. After 27 minutes the batch was discharged onto a stainless steel belt and cooled by a spray of water. The product had an intrinsic viscosity of 0.23 as measured in a 60/40 phenol/tetrachloroethane mixed solvent at 30° C. and a free carboxyl content of 21 equivalents per 10$^6$ grams of polymer.

BRIEF DESCRIPTION OF THE DRAWINGS; BEST MODE FOR CARRYING OUT THE INVENTION; INDUSTRIAL APPLICABILITY

FIG. 1 illustrates apparatus used to make the discrete spherical beads useful in the present invention. Low intrinsic viscosity polymer prepared as above was fed through inlet 1 into hopper 2 and passed into extruder 3 which melts the polymer and advances it into jacketed feed tank 4 which is a reservoir for the molten polymer and from which it is conveyed by means of gear pumps at a temperature of about 280° C. into conduit 5 maintained at a temperature above the melting temperature of the polymer by means not shown, and then conveyed upwardly into the rotating bowl 6 of a centrifugal atomizer device in spray congealer 7. The spray congealer 7 was maintained at a temperature of from about 150° to about 200° C. The bowl of the centrigual atomizer was run at a wheel speed of from 10,500 rpm to 24,000 rpm. Polymer came from the centrifugal atomizer in the form of small spherical droplets and congealed to form essentially spherical beads having an average particle size of from 100 to 250 microns, depending on the speed of rotation of the bowl. The beads descended to the bottom of spray congealer 7 and into collector 8. During operation of the centrigual atomizer nitrogen gas was introduced to the system from a source not shown by passing it through scrubber 9 into fan 10 and through heat exchanger 11 where the temperature of the gas was adjusted to the temperature desired in the spray congealer 7. Excess nitrogen was passed through exit 12 and conducted through conduit 13 into cyclone recovery unit 14 where very fine particles of polymer were recovered. The beads collected at the bottom of the cyclone recovery unit 14 and excess nitrogen passed out of the cyclone recovery unit 14 at the top of the unit where it was conveyed by a second fan 15 through valve 16 into scrubber unit 9 where glycol and other materials were removed by a spray of cold glycol pumped from cold glycol storage unit 17 through spray heads 17', 17". The nitrogen gas recovered was recirculated through the system.

When the temperature within the spray congealer is too low the polymer will form threads when cast out by the centrifugal atomizer. The lowest temperature at which threads form is termed the threading temperature. In order to form the polymer into spherical beads it is necessary to operate the equipment above this temperature. The temperature of operation of the apparatus must be below the agglomeration temperature of the resin. Thus the temperature used will be between the threading temperature of the resin and the agglomeration temperature of the resin.

The particle size of the spherical beads can be regulated by regulating the rotational speed of the centrifugal atomizer. High speeds give small beads and low speeds large beads. As pointed out above, a speed of from 10,500 rpm to 24,000 rpm produces discrete spherical beads having a size in the range of from 100 to 250 microns.

The preparation of discrete, essentially spherical beads useful in the present invention is illustrated using a centrifugal atomizer to form the molten polymer into droplets that solidify into the spherical beads. Those skilled in this art will know that other types of equipment can be used to form the droplets.

The low molecular weight prepolymer conveniently has an intrinsic viscosity sufficiently low that it is frangible and high enough that it melts over a narrow range and does not form soft waxlike particles. A generally useful range is from about 0.1 to about 0.35. The prepolymer should have less than one-half of the chain ends terminating in free COOH groups in order for it to polymerize to high molecular weight in the fluidized bed apparatus. The prepolymer should also possess a certain degree of crystallinity in order to avoid agglomeration during the solid state polymerization thereof. The requisite degree of crystallinity is accomplished in situ during the conversion of the molten prepolymer into spherical beads.

Polymer in the form of the spherical beads can be polymerized by the fluid bed process in laboratory sized equipment suitable for treating a sample of about 20 grams of polymer. The sample of spherical beads is charged into the fluid bed equipment which consists of a glass column having an inside diameter of about one inch (2.54 centimeters) and equipped with a constant temperature bath which heats the nitrogen carrier gas before it is introduced into the column and also heats the column. Nitrogen gas is passed through the prepolymer beads at 150° C. for one hour to thoroughly dry the polymer. Then the temperature of the heating bath surrounding the column used as the fluid bed reaction vessel is raised to 235° C. and nitrogen gas is passed through the bed of particles at a rate sufficient to suspend the beads in the gas [usually a flow rate of about 115 pounds/square foot per hour (0.056 kilograms/square centimeter per hour)] until the polymer attains the desired intrinsic viscosity. Usually about three hours at this temperature with this flow of nitrogen is sufficient for the polymer containing antimony catalyst to attain an intrinsic viscosity of at least 0.6 (measured in a 60/40 phenol/tetrachloroethane mixture at 30.0° C.).

Solid state polymerized polymer of this intrinsic viscosity can be used in the preparation of fibers, films and coatings.

While certain representative embodiments and details have been shown for the purpose of illustrating the invention it will be apparent to those skilled in this art that various changes and modifications may be made therein without departing from the spirit or scope of the invention.

I claim:

1. In a solid state process for polymerizing low molecular weight particulate polyester prepolymer to high molecular weight polyester resin the improvement which comprises the use in said process of dry, crystalline polyester prepolymer having an intrinsic viscosity ranging from about 0.1 to about 0.35 and essentially in the form of discrete spherical beads ranging in size from about 100 to about 250 microns in diameter.

2. The process of claim 1 in which the solid state process is a fluidized bed solid state process wherein a layer of the prepolymer is contained in a polymerization vessel and an inert gas, maintained at a temperature ranging from about 5° C. to about 50° C. below the melting point of the prepolymer, is introduced to said vessel and passed through said prepolymer layer at a rate sufficient to sustain the prepolymer in the gas and in which process the improvement comprises the use of dry, crystalline polyester prepolymer having an intrinsic viscosity ranging from about 0.1 to about 0.35 and essentially in the form of discrete spherical beads ranging in size from about 100 to about 250 microns in diameter.

3. The improvement of claim 2 wherein the discrete spherical beads are prepared by introducing molten amorphous polyester prepolymer condensate having an intrinsic viscosity ranging from about 0.1 to about 0.35 into a vertically positioned spray congealing vessel having a top and bottom portion and through an atomizing device located in the top portion of said vessel to form molten spherical droplets said droplets descending downwardly from said atomizing device, through said spray congealing vessel in a concurrently flowing gaseous atmosphere, into a collection vessel attached to the bottom portion of said spray congealing vessel.

4. The improvement of claim 3 wherein the molten amorphous polyester prepolymer condensate is introduced into the vertically positioned spray congealing vessel and through a centrifical atomizer located in the top portion of said vessel.

5. The improvement of claim 3 in which the molten amorphous polyester prepolymer condensate is polyethylene terephthalate.

6. The improvement of claim 3 wherein the concurrently flowing gaseous atmosphere is maintained at a temperature above the threading temperature of the molten prepolymer condensate but below the temperature at which the molten spherical droplets adhere to the walls of the spray congealing vessel.

7. The improvement of claim 3 wherein the concurrently flowing gaseous atmosphere is maintained at a temperature above the threading temperature of the molten prepolymer condensate but below the agglomeration temperature of the dry crystalline polyester prepolymer essentially in the form of discrete spherical beads.

8. The improvement of claim 3 wherein the concurrently flowing gaseous atmosphere is maintained at a temperature ranging from about 150° C. to about 200° C.

* * * * *